Oct. 15, 1935.　　D. J. HANNA ET AL　　2,017,046
DOUGHPROOFING MACHINE
Filed March 15, 1933　　8 Sheets-Sheet 2
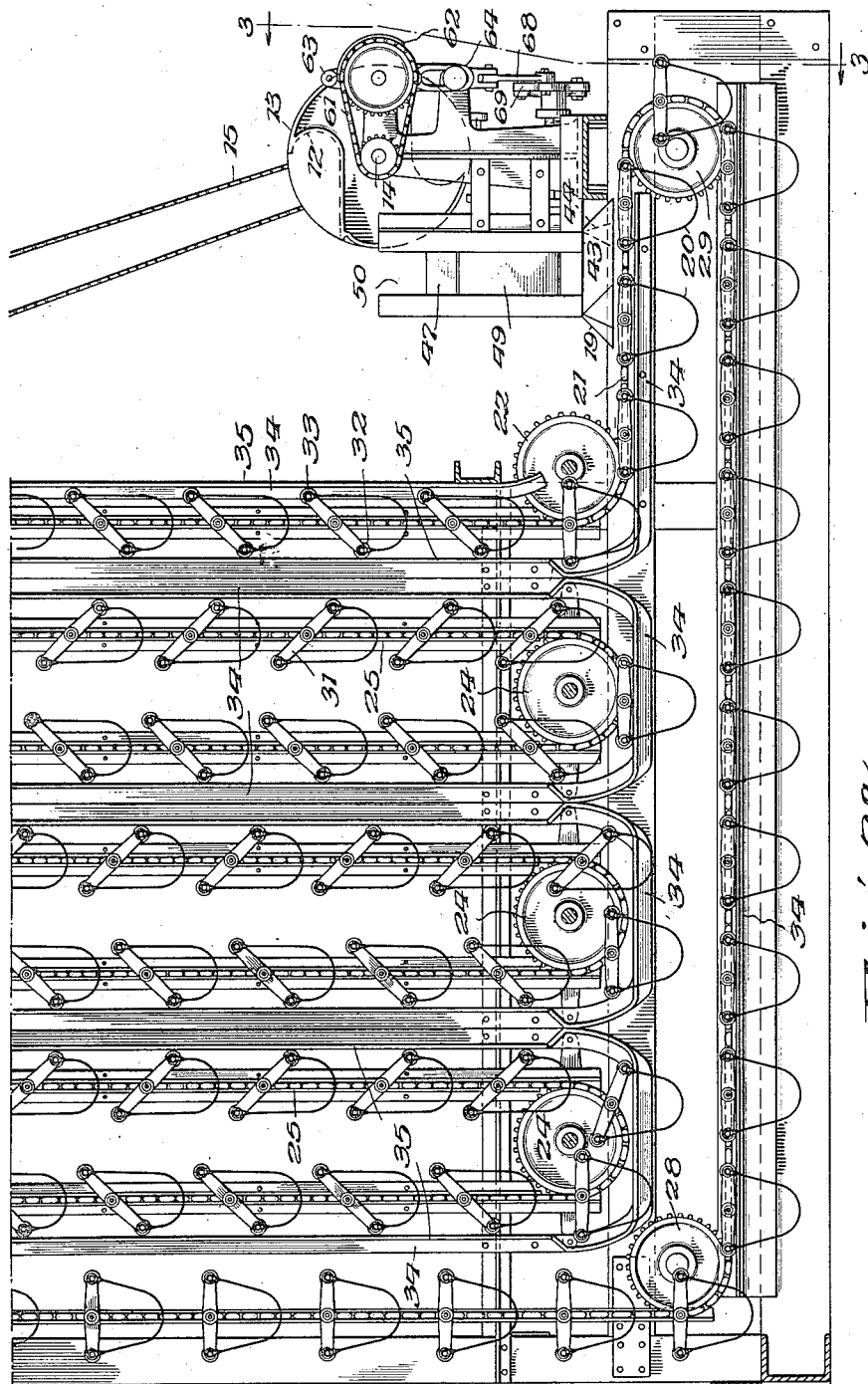

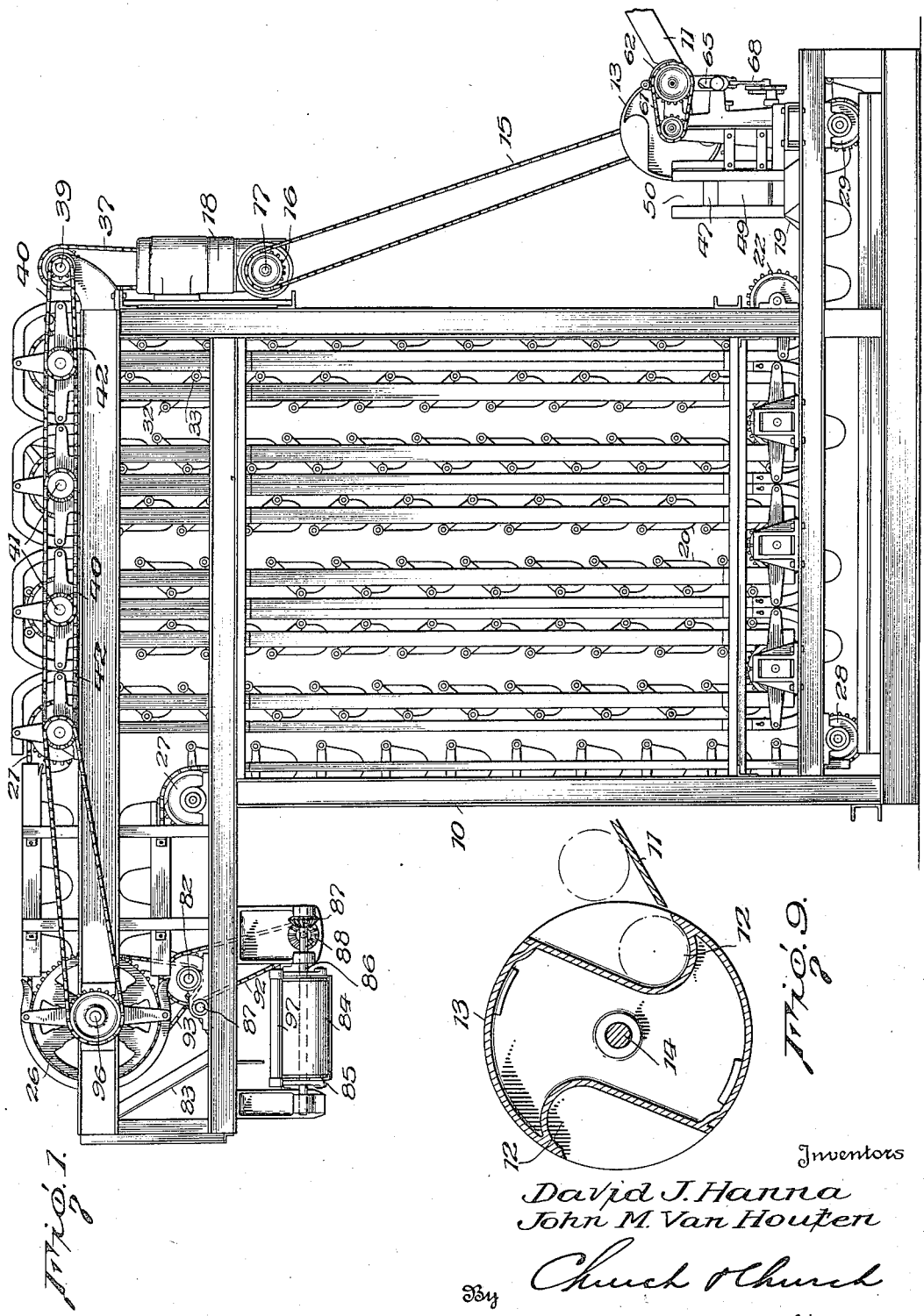

Oct. 15, 1935.   D. J. HANNA ET AL   2,017,046
DOUGHPROOFING MACHINE
Filed March 15, 1933   8 Sheets-Sheet 3

Inventors
David J. Hanna
John M. Van Houten

By Church & Church
Their Attorneys

Oct. 15, 1935.  D. J. HANNA ET AL  2,017,046
DOUGHPROOFING MACHINE
Filed March 15, 1933   8 Sheets-Sheet 4

Inventors
David J. Hanna,
John M. Van Houten
By Church & Church
Their Attorneys

Oct. 15, 1935.    D. J. HANNA ET AL    2,017,046
DOUGHPROOFING MACHINE
Filed March 15, 1933    8 Sheets-Sheet 5
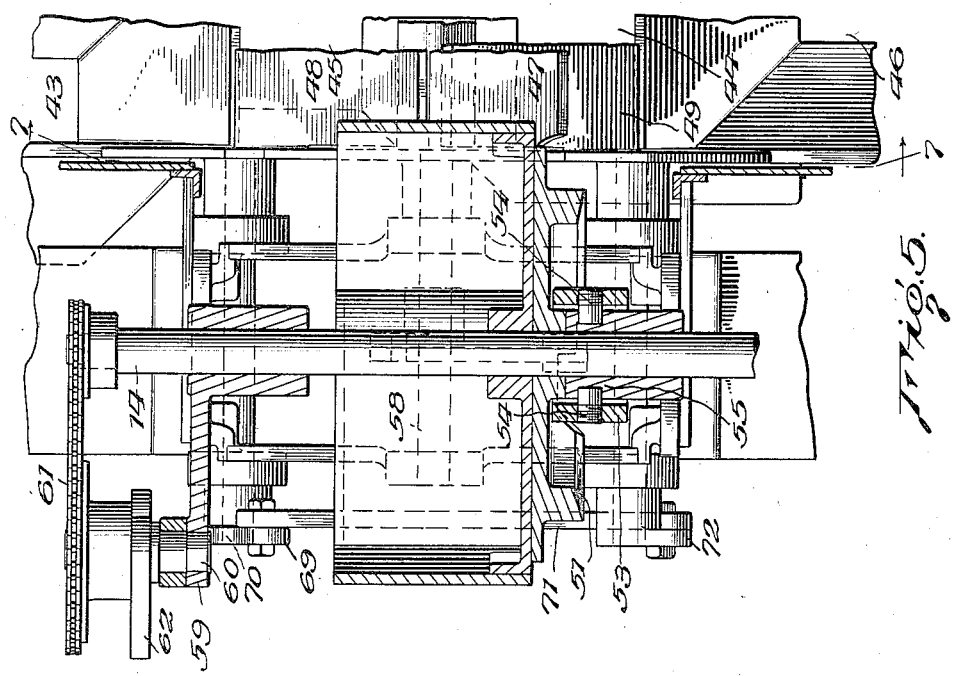
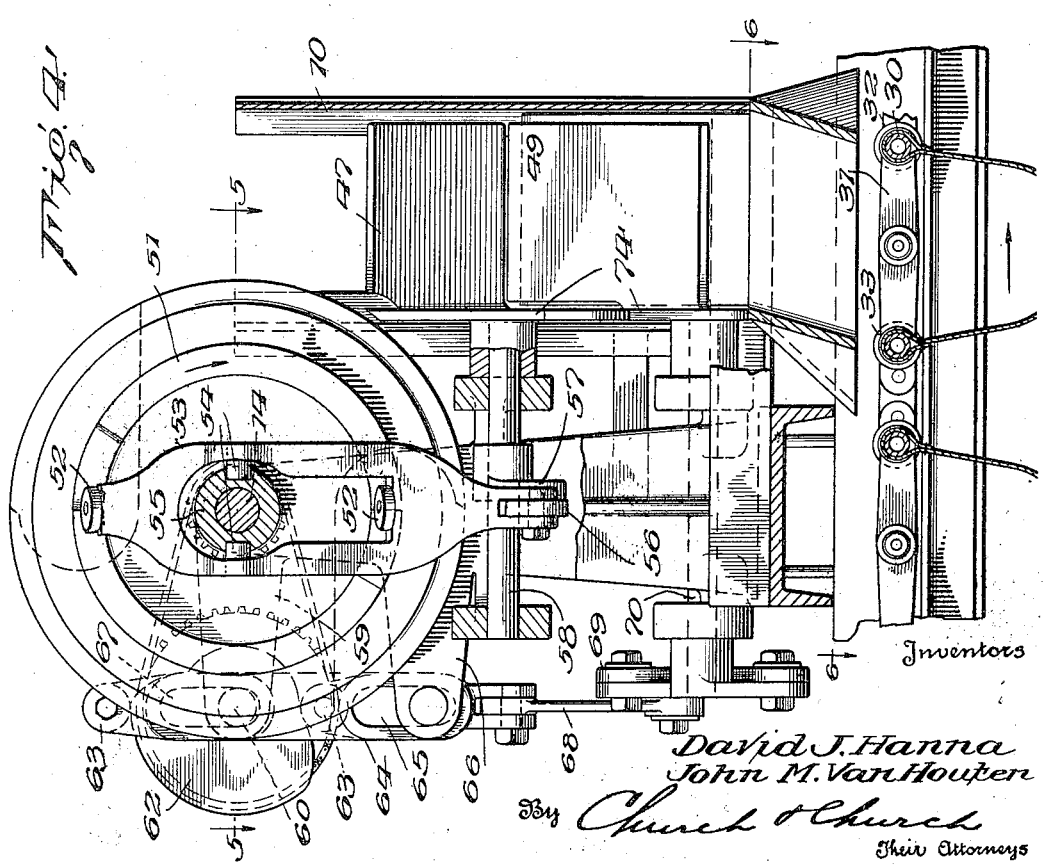
Inventors
David J. Hanna
John M. Van Houten
By Church & Church
Their Attorneys Oct. 15, 1935.    D. J. HANNA ET AL    2,017,046
DOUGHPROOFING MACHINE
Filed March 15, 1933    8 Sheets-Sheet 6
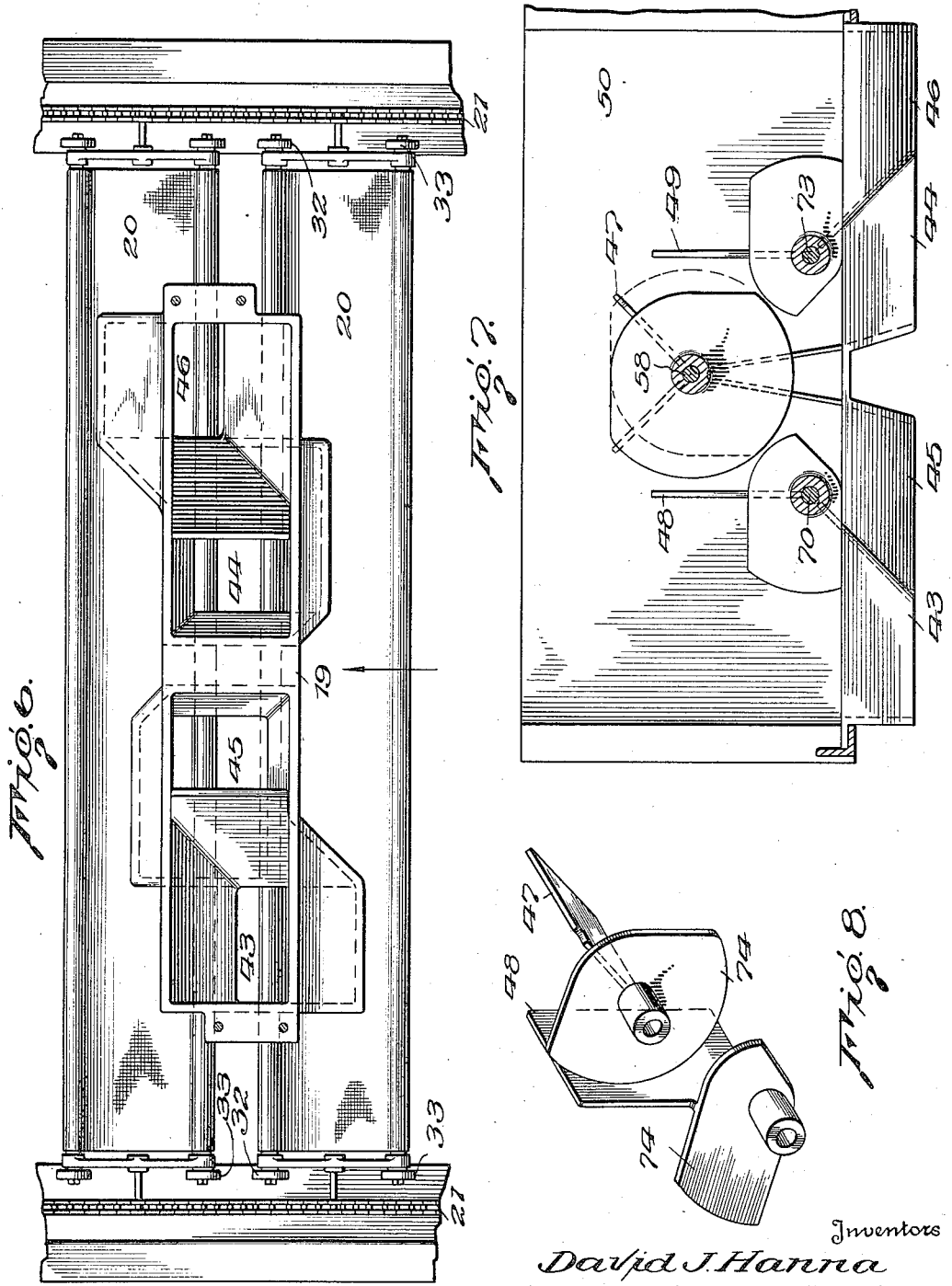
Inventors
David J. Hanna
John M. Van Houten
By Church & Church
Their Attorneys Oct. 15, 1935.   D. J. HANNA ET AL   2,017,046
DOUGHPROOFING MACHINE
Filed March 15, 1933   8 Sheets—Sheet 7
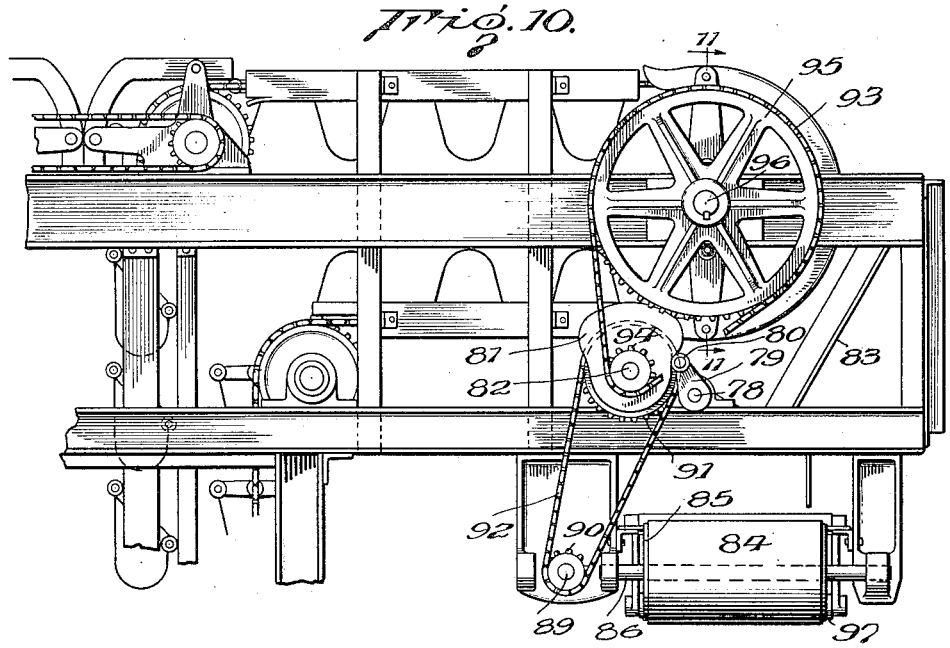
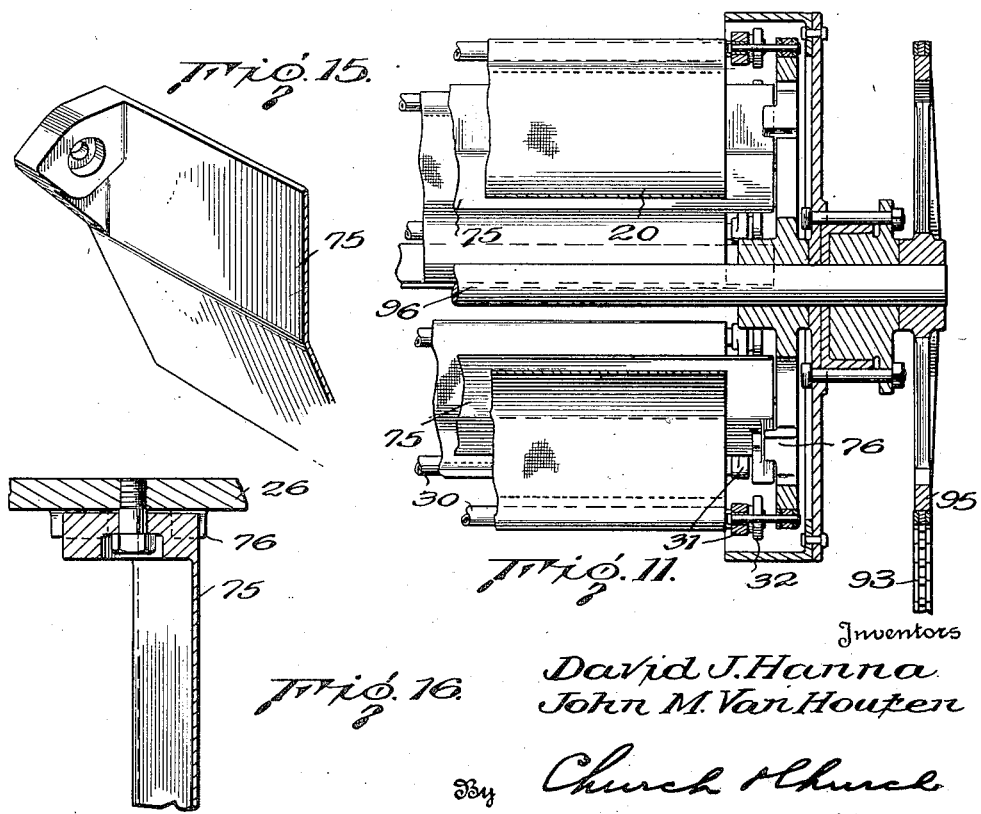

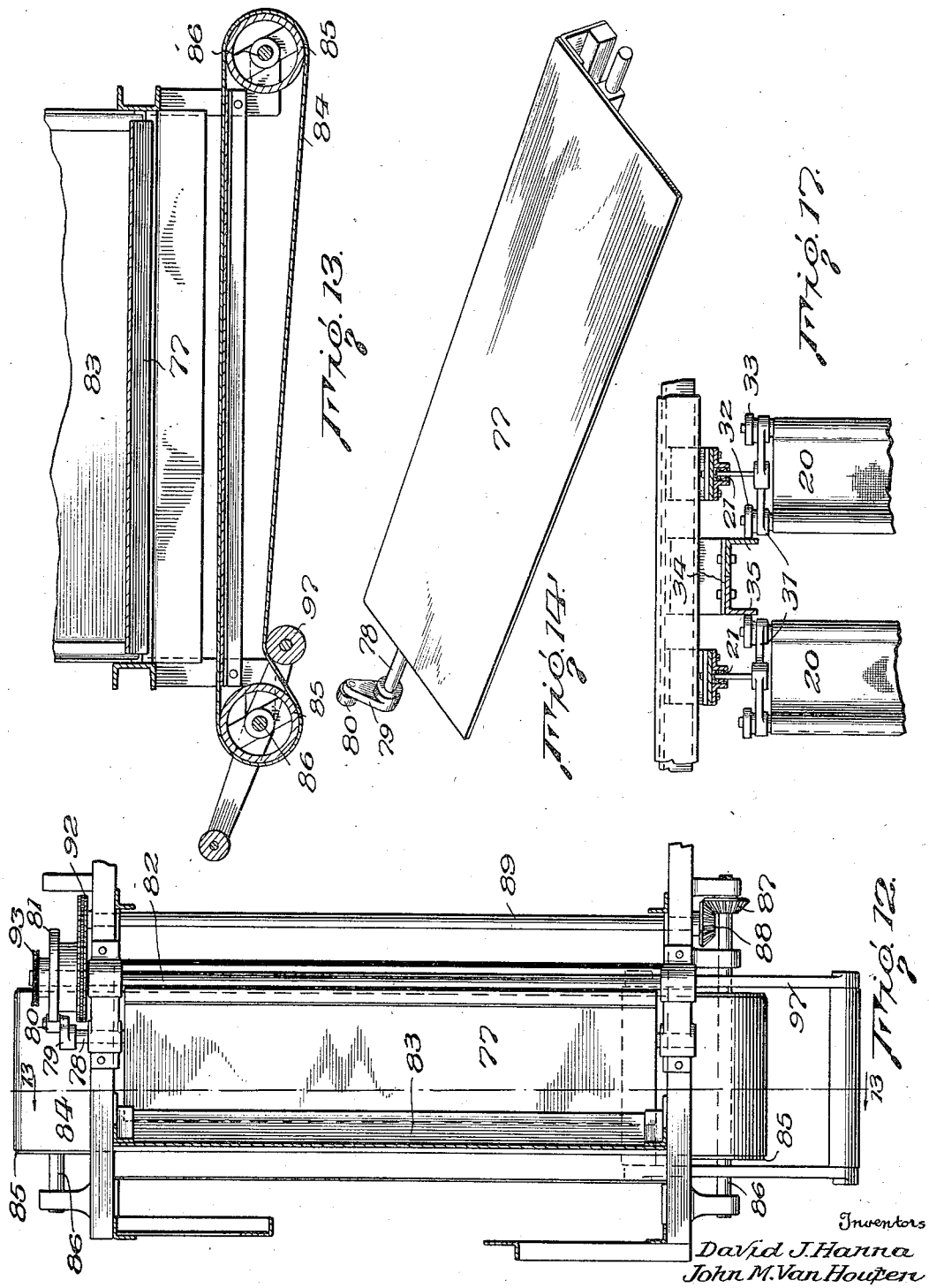

Patented Oct. 15, 1935

2,017,046

UNITED STATES PATENT OFFICE 2,017,046

DOUGHPROOFING MACHINE

David J. Hanna and John M. Van Houten, Beacon, N. Y., assignors to Dutchess Tool Company, Beacon, N. Y., a corporation of New York Application March 15, 1933, Serial No. 660,956

6 Claims. (Cl. 198—153)

This invention relates to improvements in dough handling apparatus, and particularly to that form of apparatus utilized for treatment of the dough between the balling and the molding thereof, so as to present the dough in a more favorable condition and shape to the molder. Such apparatus is commonly known in the art as a proofer.

One object of the invention is to provide a proofer which, in manipulating the individual balls of dough, will form them into elongated shapes. This practice is highly desirable, because, if an elongated lump of dough is fed into the sheeting rolls of a molder, the crush of the rolls on the dough is less severe than if the ball of dough is fed into the molder sheeting rolls in spherical form.

Another object is the provision of mechanism for proofing the dough, wherein the dough will constantly contact with different portions of the dough supporting element, or, in other words, the individual pieces of dough do not rest continually on any one portion of the surface, but are continually moved, so that the outside skin remains moist and neither becomes dry, nor adheres to the surface of the dough supporting element.

A still further object consists in the provision of means for delivering successive individual pieces of dough to a constantly moving container, the container in this instance constituting the dough supporting surface which effects the proofing of the dough. In addition to this feeding mechanism for the apparatus, the invention also contemplates a novel form of discharge mechanism. More particularly, the invention contemplates the use of containers having their sides formed of flexible or pliant material, whereby the dough may have a rolling action imparted thereto by raising or lowering opposite sides of the containers and, in order to discharge the dough form such containers, the latter are inverted. For this reason, the discharge mechanism comprises means for supporting the flexible or pliant material constituting the sides of the containers during the inversion of the latter.

With these and other objects in view, the invention consists in certain details of construction and combinations and arrangements of parts, all as will hereinafter be more fully described, and the novel features thereof particularly pointed out in the appended claims.

In the accompanying drawings,

Figure 1 is a side elevation of the present apparatus;

Figs. 2a and 2b, jointly, constitute a view quite similar to Fig. 1, but partly in section, and somewhat enlarged, to more clearly illustrate certain interior portions of the construction;

Fig. 4 is a sectional view on the line 4—4 of Fig. 3;

Fig. 5 is a horizontal sectional view on the line 5—5 of Fig. 4;

Fig. 6 is a horizontal sectional view on the line 6—6 of Fig. 4;

Fig. 7 is a vertical sectional view on the line 7—7 of Fig. 5;

Fig. 8 is a detailed perspective view of a portion of the mecahnism for feeding the lumps of dough into the proofing containers;

Fig. 9 is a sectional view through the feeding drum by which the lumps of dough are fed regularly and intermittently to the proofing containers;

Fig. 10 is a somewhat enlarged side elevation of the discharge mechanism;

Fig. 11 is a vertical sectional view on the line 11—11 of Fig. 10;

Fig. 12 is a horizontal sectional view on the line 12—12 of Fig. 2b;

Fig. 13 is a vertical sectional view on the line 13—13 of Fig. 12;

Fig. 14 is a detail perspective view of the discharge platform;

Fig. 15 is a detail perspective view of a portion of one of the members for supporting the flexible containers while inverted during the discharge of the dough;

Fig. 16 illustrates one end of one of said supporting elements, illustrating its mounting in the apparatus; and Fig. 17 is a horizontal sectional view on the line 17—17 of Fig. 2b.

In the present apparatus, the individual lumps of dough are proofed by imparting a rolling motion to them, while in a container, the container having its side walls and bottom formed of flexible material, whereby, by rocking the container, the dough will be constantly shifted on the interior surface thereof, and a rolling action imparted to the lump. Preferably, there is an endless series of these containers, constantly moving along ways supported in a suitable manner in the frame 10. As it is desirable to have the container moving constantly to avoid vibration, means are provided for delivering successive individual lumps of dough to each container as it progresses along its path of travel in the frame. In this connection, it will be observed that the containers are elongated and the rolling motion of the lumps of dough is transversely of the containers, whereby the lumps of dough are each elongated instead of being proofed in the form of a sphere. At the discharge end of the apparatus the individual containers are inverted, the flexible or pliant material constituting the sides of the material being supported by suitable means. Upon the successive containers being inverted, the several lumps of dough fall therefrom and are preferably received upon a platform which is tilted in timed relation with respect to the movement of the containers and, when so tilted, the dough is discharged from the platform onto an endless conveyor, where it is transported to the next point where it is to receive further treatment.

Figure 3:
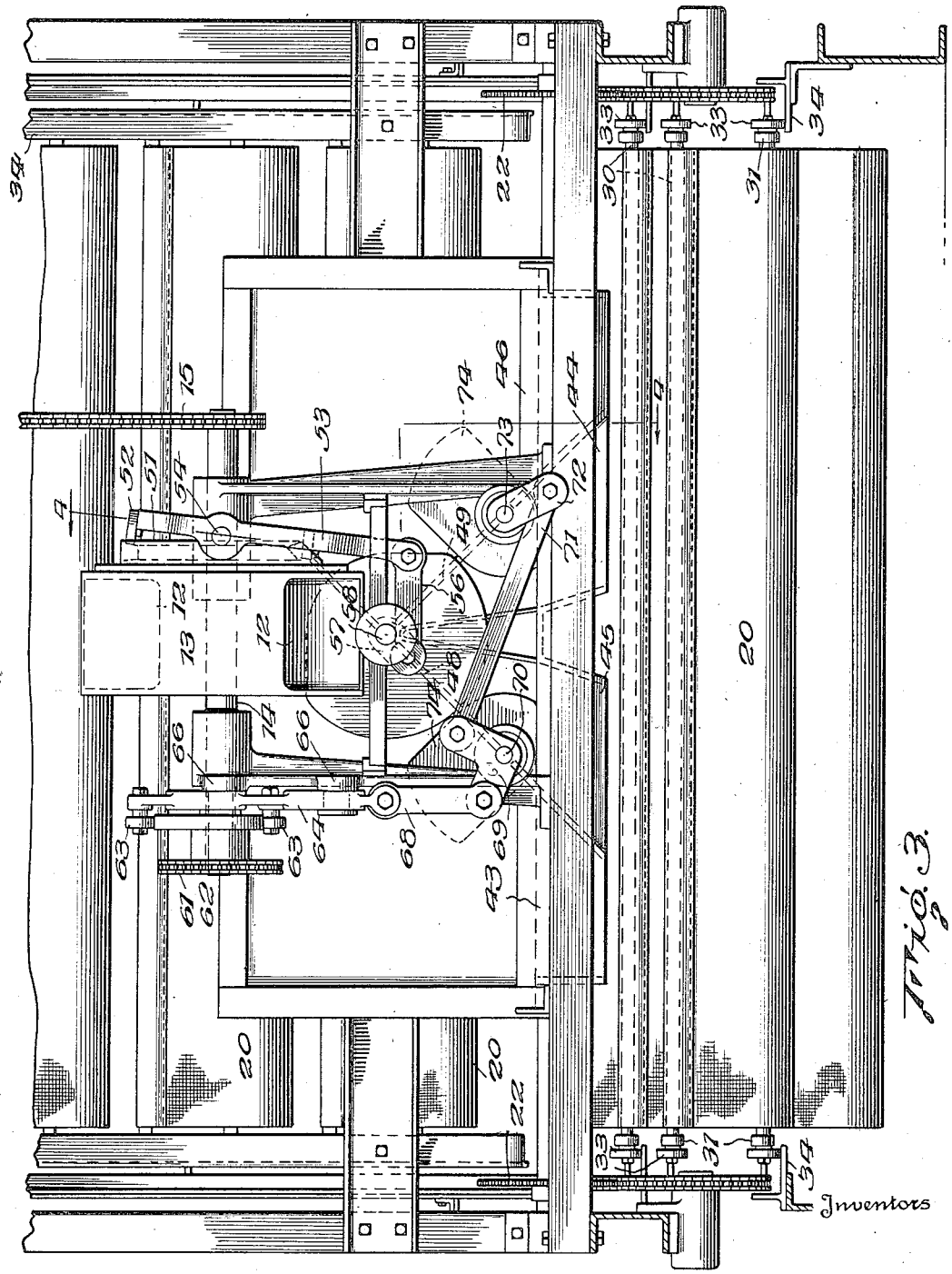
Fig. 3 is an elevational view of the lower portion of the end of the apparatus, at which the dough to be proofed is fed into the proofing mechanism.

In the specific form of the invention illustrated, the lumps of dough are fed down a chute 11, successive lumps of dough being received in pockets 12, preferably arranged diametrically opposite in a feeding drum 13 (Fig. 9), mounted on a shaft 14, which is driven by drive chain 15 from a sprocket 16 on a shaft 17, to which motion is imparted from a motor 18. As the drum 13 is rotated, the successive lumps of dough fall from the pockets 12 and are delivered at regular intervals to a feeding mechanism, which will be more fully described hereinafter, and which deposits a certain number of successive lumps of dough in a container as it progresses along its normal line of movement. This feeding mechanism comprises a casting 19 in which there are a plurality of chutes whose discharge ends are positioned over the containers 20, which are carried by endless traveling chains 21 at opposite sides of the frame, through the apparatus. From a point immediately below the feeding chutes, chains 21 carrying the containers pass over sprockets 22, then upwardly and over sprockets 23 in the upper portion of the frame, thence downwardly and around sprockets 24 and over successive upper and lower sprockets 23, 24, to form any desired number of vertically extending reaches 25. From the last pair of upper sprockets 23, the chains pass to and around sprockets 26, which constitute, in a sense, a portion of the discharge mechanism and, after passing around said sprockets 26, the chains then pass over sprockets 27, downwardly and around sprockets 28, and thence horizontally along the lower portion of the frame and around sprockets 29, and back to the point below the feeding chutes in casting 19. The containers 20 are preferably made of some pliant or flexible material such as canvas, the elongated strips of canvas being suspended from bars 30, which extend transversely of the frame and are mounted at their ends in arms 31 pivotally supported on the chains 21. The arms 31 also carry at their ends rollers 32, 33, which travel along tracks or ways 34. As each pivoted arm 31 moves upwardly along one of the vertical reaches, the rollers 32 engage offset portions 35 of the tracks or ways, so as to depress and rock the arms at opposite sides of the machine in one direction. This movement of the arms lowers one side of the container and raises the other, and imparts a rolling motion to the lump or lumps of dough in the container, the lump of dough rolling transversely of the elongated containers, so as to cause an elongation in the shape of the lump or lumps. Also, as each pair of arms start downwardly on any one of the vertical reaches, the rollers 32 engage offset portions 36 of the tracks or ways and cause the ends of the pairs of arms carrying the rollers 33 to be depressed, in which position they are held by engagement with the tracks at their side of the containers, until they reach the lower limit of their travel. Due to this motion, the individual containers are again rocked to raise the previously lowered side and depress the previously raised side, whereupon the lump or lumps of dough are rolled in reverse direction. This rocking back and forth of the arms to raise and lower the sides of the containers is repeated each time a container passes up and down two of the juxtaposed vertical reaches. It will be observed that, as the arms pass around the sprockets 22, 23, the tracks or ways 34 cause the container arms to assume their normal horizontal position. Motion is imparted to the chain carrying the pivoted arms or containers from the motor shaft 17 by a sprocket chain 37 passing over a sprocket 38 on shaft 39, from which power is transmitted to the several shafts 41 of sprockets 23 by sprocket chains 40 passing around sprockets 42 on said shafts. The feeding mechanism (Figs. 3 to 8), in addition to the feeding drum 13, comprises the casting 19 in which there are a plurality of chutes 43, 44, 45 and 46, arranged with their respective discharge openings, one in advance of the other along the line or path of movement of the containers 20. As the lumps of dough fall from the pockets in drum 13, they are delivered by mechanism in such fashion that the first of a series of four lumps will be delivered to chute 43, the next to the chute 44, the next to chute 45, and the last to chute 46, so that the four successive lumps of dough will all be deposited in the same container 20. This mechanism for diverting the lumps of dough to the several chutes consists of a plurality of pivoted guide plates 47, 48 and 49, within a passage-way 50, into which the lumps of dough are discharged from the drum 13. The several guide plates are adapted to be rocked by mechanism which consists of a cam member 51 mounted on shaft 14 of the delivery drum and which is engaged at diametrically opposite points by rollers 52 on a rocking lever 53, pivoted at 54 in a bushing 55 surrounding shaft 14. The lower end of rocking lever 53 is attached by a link 56 to an arm 57 mounted on the shaft 58, which carries guide plate 47. Mounted in a bracket 59 is a stub shaft 60 driven by sprocket chain 61 from the shaft 14 of the delivery drum. Mounted on stub shaft 60 is a cam 62 which is engaged by cam roller 63 carried by a reciprocatory link 64 slidably mounted by pin and slot connections 65 on the arm 66 of the bracket 59, and by the pin and slot connection formed by the shaft 60 passing through the slot 67 in said link. At its lower end, the reciprocatory link 64 is attached by connecting link 68 to one arm of a bell crank lever 69 mounted on the shaft 70 of guide plate 48. The other end of said bell crank lever is attached by a connecting link 71 to an arm 72 mounted on the shaft 73 of the guide plate 49. The contours of the cam surfaces 51 and 62 are such that, by the use of the two cam rollers 52, the guide plate 47 will be rocked twice for each time the guide plates 48, 49 are rocked, and the connections between shafts 70 and 73 are such that the guide plates 48, 49 will be rocked in unison, the two plates being held in vertical position, as shown in Fig. 7, at the same time and being rocked toward the base of guide plate 47 together, as shown in dotted lines in Fig. 3. More specifically, the cycle of operations of the several plates is as follows: With the plates in the positions in which they are shown in Fig. 3, the first lump of dough discharged from the delivery drum 13 will be diverted by plates 47, 48, into the chute 43. At the time the next lump of dough is discharged from the delivery drum, plate 47 will have been moved to the position shown in dotted lines in Fig. 7 and the plates 48, 49, will be moved to the positions in which they are shown in that figure, under which circumstances, the second lump of dough will be diverted by plate 47 into chute 44. By the time the third lump of dough is discharged from the delivery drum, plate 47 will be rocked back to its original position, or the position shown in dotted lines in Fig. 3 and in full lines in Fig. 7, but the plates 48, 49 will remain in the positions shown in Fig. 7, under which conditions, the third lump of dough will be diverted by plate 47 into chute 45. By the time the fourth of the series of the lumps of dough is discharged from the delivery drum, plate 47 will have again been returned to the position shown in dotted lines in Fig. 7, and the plates 48, 49 restored to the position shown in dotted lines in Fig. 3, so that the said fourth lump of dough will roll along plates 47 and 49 into the delivery chute 46. By the time the next lump of dough, or the first lump of dough for the second series is delivered by drum 13, plate 47 will have been returned to its starting position as shown in dotted lines in Fig. 3 and during this movement of said plate, the plates 48, 49 will have remained stationary, whereupon the next cycle of operations will have been initiated and the said fifth lump of dough diverted to delivery chute 43. With this arrangement it will be seen that each set of four lumps of dough will be fed into the same container 20, because, although the container is constantly moving, the discharge ends of the several chutes are positioned one in advance of the other, along the path of the traveling container. If desired, the several guide plates 47, 48, 49, may be formed with transversely extending plate-like portions 74, which will assist in steadying the several guide plates in their various positions.

The lumps of dough, after being proofed, may be discharged from the containers in various ways, but preferably this is accomplished by inverting the containers. In the present instance, the endless chain 21 and the containers 20, after passing the last upper sprocket wheel 23, pass around the large sprockets 26 during which time the containers are inverted and it is at this period of their travel through the apparatus that the lumps of dough are discharged by falling from the containers. Due to the flexibility of the canvas, or other material constituting the containers, it is necessary that at least one side of a container be supported while being inverted. To accomplish this result, the spokes of the sprockets 26 are spaced apart a distance substantially equal to the width of a container, and each spoke has pivoted thereto a supporting plate 75, which will engage and support the containers at one side thereof, pivotal movement of each of said supports being limited in one direction by stops 76 formed on the spokes, whereby those supporting plates 75 at the sides of the sprockets which are moving downwardly cannot swing away from the container wall, but will support said wall in a position which will insure the lumps of dough falling out. Preferably, the lumps of dough when discharged from their containers, drop upon a discharge platform 77 mounted on a shaft 78 and adapted to be rocked by having formed thereon an arm 79 carrying a cam roller 80, which engages a cam 81 on a shaft 82. In other words, the platform 77 will not be tilted by the weight of the dough thereon, but will be held in the position shown in Fig. 2b until the predetermined time which, in the present instance, is of sufficient duration to insure all of the lumps from any one container being discharged. The platform 77 may be normally somewhat inclined, a retaining plate 83 being provided at its lower edge portion. When the platform 77 is tripped, the lumps of dough are delivered from the platform onto an endless conveyor 84, traveling on rollers 85 on shafts 86. Disposition of the weight of platform 77, arm 79 and roller 80, relatively to shaft 78, is such that the roller remains in engagement with the periphery of cam 81 at all times. One shaft 86 carries a bevel gear 87 meshing with a similar gear 88 on a shaft 89. Shaft 89 is provided with a sprocket 90 and shaft 82 with a sprocket 91, these two sprockets being connected by sprocket chain 92, and motion is imparted to both of said shafts by sprocket chain 93, traveling over a sprocket 94 on shaft 82, and a sprocket 95 on the shaft 96, on which the sprocket members 26 are mounted. The conveyor 84 may be maintained under the desired tension by the tensioning device 97.

Figure 2B:
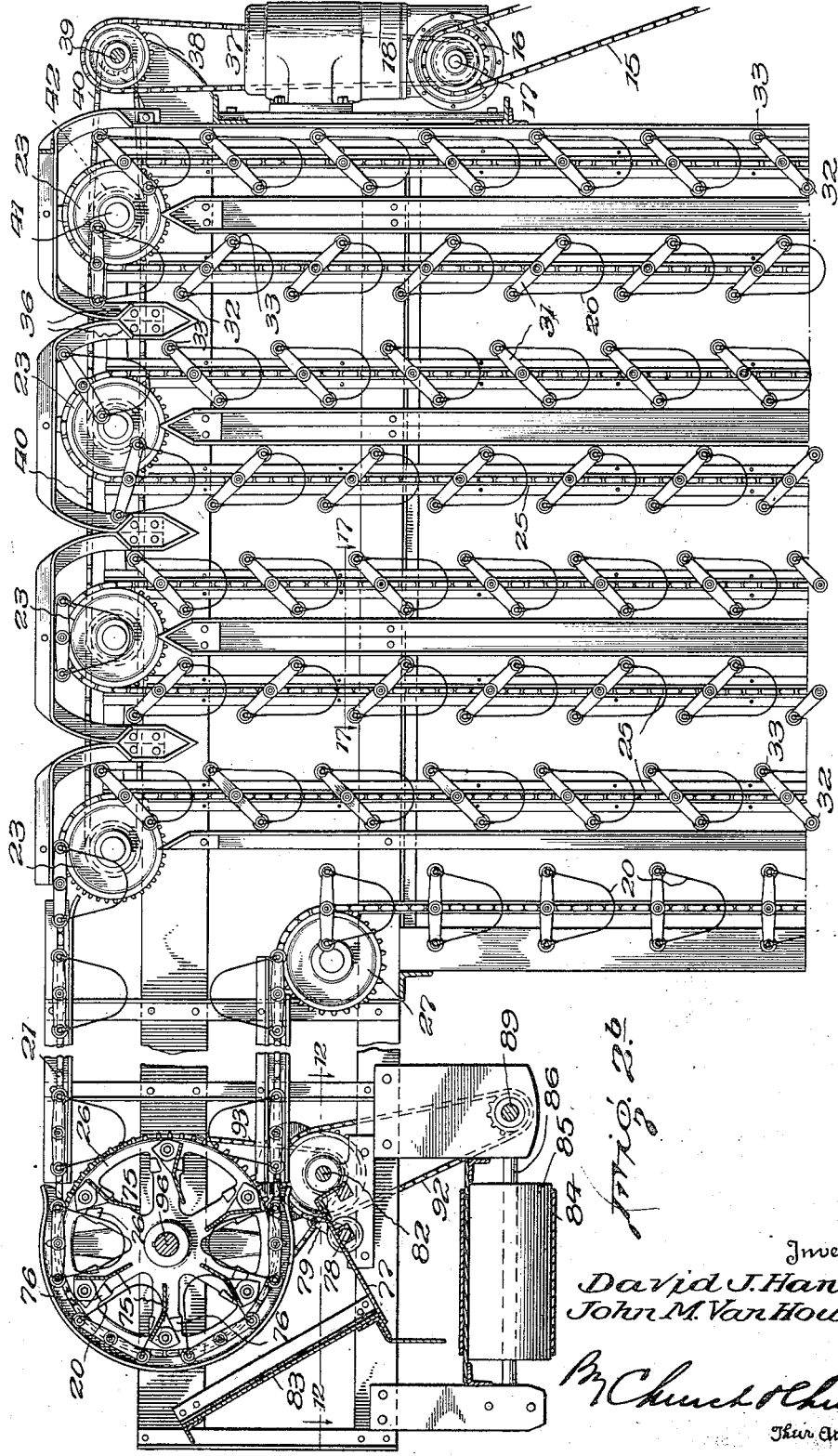

In operation, lumps of dough are fed along chute 11 to delivery drum 13 and the successive lumps of dough deposited in the delivery chutes 43, 44, 45, 46, in the order stated, so that each set of four consecutive lumps of dough is deposited in one of the containers 20, as it passes, in constant motion, beneath the several chutes. The containers then travel up and down the several vertically disposed reaches and during such upward and downward travel, the arms 31 are rocked back and forth by engagement with the offset portions 35, 36, of the track 34, as shown in Figs. 2a and 2b. This rocking motion of the arms causes the lumps of dough to roll back and forth transversely of the containers, so that the surfaces of the lumps do not become dry on account of being constantly shifted, but, the individual lumps of dough are caused to be elongated, whereby, when they are fed between the sheeting rolls of the molder, less crushing effect will be exerted thereon by said sheeting rolls. After passing upwardly along the last vertical reach and over the last sprocket 23, the containers move into engagement with the supporting plates 75 pivoted on the spokes of the sprockets 26 at the discharge end of the apparatus and as they pass around said sprockets, the lumps of dough are discharge onto the platform 77, and, subsequently, upon the platform being tripped, deposited on the conveyor 84, by which they may be transported to another point for subsequent manipulation or treatment.

What we claim is:

1. In a dough proofing apparatus, the combination of spaced endless traveling elements, arms pivoted on said traveling elements, containers suspended from said arms in which lumps of dough to be proofed are deposited, and means for rocking said arms to impart a rolling motion to lumps of dough in the containers.

2. In a dough proofing apparatus, the combination of a plurality of pairs of traveling pivoted arms, a container suspended from each pair of arms, and means for rocking said arms to impart a rolling motion to lumps of dough in the containers.

3. In a dough proofing apparatus, the combination of a pair of endless traveling members, an arm pivoted on each member, a container carried by said arms, means for depositing a lump of dough in said container, and means for alternately engaging opposite ends of said arms and rocking said container to impart a rolling motion to dough in said container.

4. In a dough proofing apparatus, the combination of a pair of endless traveling members arranged in alined reaches, oppositely disposed arms pivoted on each member, a container on each pair of opposed arms, means for depositing lumps of dough in said containers, means engageable with said arms as the latter traverse alternate reaches for rocking said arms in one direction, and means engageable with said arms as they traverse the other alternate reaches for rocking said arms in the opposite direction.

5. In a dough handling apparatus, the combination of a series of containers each formed with side walls of flexible material, means for depositing a plurality of lumps of dough in each container, means for inverting the container to discharge the dough therefrom, and a series of supports engageable against the flexible walls of the containers to support the same when inverted.

6. In a dough handling apparatus, the combination of a series of containers each having flexible side walls, means for depositing dough in each container, means for inverting the containers to discharge the dough therefrom, a rotatable series of supports engageable with the flexible walls of the containers to support the same when inverted, a platform on which the dough is deposited from the containers, and means operable in timed relation with respect to the rotary movement of the supports for removing the dough from said platform.

DAVID J. HANNA.
JOHN M. VAN HOUTEN.